(12) United States Patent
McCoy

(10) Patent No.: US 11,443,597 B2
(45) Date of Patent: Sep. 13, 2022

(54) URINAL-BASED MULTIPLAYER GAME SYSTEM

(71) Applicant: SUN WEST ENGINEERING, INC., Phoenix, AZ (US)

(72) Inventor: Phillip McCoy, Peoria, AZ (US)

(73) Assignee: Sun West Engineering, Phoenix, AZ (US)

( * ) Notice: Subject to any disclaimer, the term of this patent is extended or adjusted under 35 U.S.C. 154(b) by 0 days.

(21) Appl. No.: 16/893,862

(22) Filed: Jun. 5, 2020

(65) Prior Publication Data

US 2021/0383653 A1 Dec. 9, 2021

(51) Int. Cl.
| | |
|---|---|
| *A63F 13/218* | (2014.01) |
| *A63F 13/837* | (2014.01) |
| *G07F 17/32* | (2006.01) |
| *E03D 13/00* | (2006.01) |

(52) U.S. Cl.
CPC ....... *G07F 17/3295* (2013.01); *E03D 13/005* (2013.01); *G07F 17/3206* (2013.01); *G07F 17/3213* (2013.01); *G07F 17/3216* (2013.01); *G07F 17/3255* (2013.01); *G07F 17/3276* (2013.01)

(58) Field of Classification Search
CPC .... A63F 13/218; A63F 13/219; A63F 13/837; A63F 9/001; A63F 9/24; A63F 2009/2442; A63F 2300/8094; E03D 13/005
See application file for complete search history.

(56) References Cited

U.S. PATENT DOCUMENTS

| | | | | |
|---|---|---|---|---|
| 6,385,796 B1* | 5/2002 | Muir, Jr. | ................. | E03D 13/00 4/304 |
| 6,513,173 B1* | 2/2003 | Sykes | .................... | A47K 11/12 4/301 |
| 9,550,115 B2* | 1/2017 | Silva | ........................ | A63F 9/02 |
| 2010/0313973 A1* | 12/2010 | Grumbles | ............. | E03D 13/005 137/551 |
| 2018/0163388 A1* | 6/2018 | Staton | .................... | A61B 5/207 |

* cited by examiner

*Primary Examiner* — Jasson H Yoo

(74) *Attorney, Agent, or Firm* — Jennings Strouss & Salmon P.L.C.

(57) ABSTRACT

A urinal-based multiplayer gaming system is provided. The system includes a plurality of urinals, each including a respective urine sensing system, each urine sensing system configured to sense, when active, a urine stream attribute of urine collected at that urinal. A common display is viewable from each of the plurality of urinals. A processing system is configured to: execute a computer-implemented game responsive to urine stream attributes received from the active urine sensing systems; and render game graphics on the common display during execution of the computer-implemented game, wherein the game graphics include, for each of the active urine sensing systems, a corresponding graphical component.

6 Claims, 3 Drawing Sheets

URINAL-BASED MULTIPLAYER GAME SYSTEM

TECHNICAL FIELD

The present invention relates, generally, to game systems and, more particularly, to multiplayer, casual game systems operated through unconventional user interfaces.

BACKGROUND

Businesses continue to seek innovative ways to engage with their customers, from targeted advertisements to customized mobile apps, loyalty programs, and the like. In recent years, many organizations have attempted to "gameify" certain customer-facing components of their businesses, challenging their customers and users to compete for badges, points, and other such rewards.

One area of potential gamification that has been largely ignored is the restroom—particularly in sports bars, restaurants, nightclubs, and other such businesses with a substantial male clientele who are likely to visit the restroom and utilize a urinal multiple times a night. At the same time, businesses have a strong interest in maintaining the cleanliness of the restrooms, a factor that is, unfortunately, a strong function of how accurately their male customers utilize the urinals. And while there have been some attempts to incorporate game elements into urinals, including small, individual display screens and urine stream sensors, such systems generally provide only a solitary, single-player experience with no real benefit to the customer or the business.

Systems and methods are therefore needed that overcome these and other limitations of the prior art.

SUMMARY OF THE INVENTION

Various embodiments of the present invention relate to systems and methods for, inter alia: i) multiplayer gaming systems in which users compete based on one or more attributes of their respective urine streams; ii) the dispensation of loyalty points, prize items, or other awards in connection with such multiplayer gaming systems; and iii) the use of mobile devices configured to interact with such multiplayer gaming systems.

BRIEF DESCRIPTION OF THE DRAWING FIGURES

The present invention will hereinafter be described in conjunction with the appended drawing figures, wherein like numerals denote like elements, and:

DETAILED DESCRIPTION OF PREFERRED EXEMPLARY EMBODIMENTS

The present subject matter relates to multiplayer games whose participants compete based one or more characteristics of their urine streams—e.g., accuracy, volume, physical properties, or the like. The results of the game may be viewable on a common display by a group of users who are competing simultaneously. Alternatively, the users may view the results at a later time on a mobile device or other display that is remote from the game system itself. Various rewards, such as loyalty points, free drinks, or the like may be provided to the users based on the results. In that regard, the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to urinals, bathroom plumbing, and fluidic sensing systems may not be described in detail herein.

Figure 1:
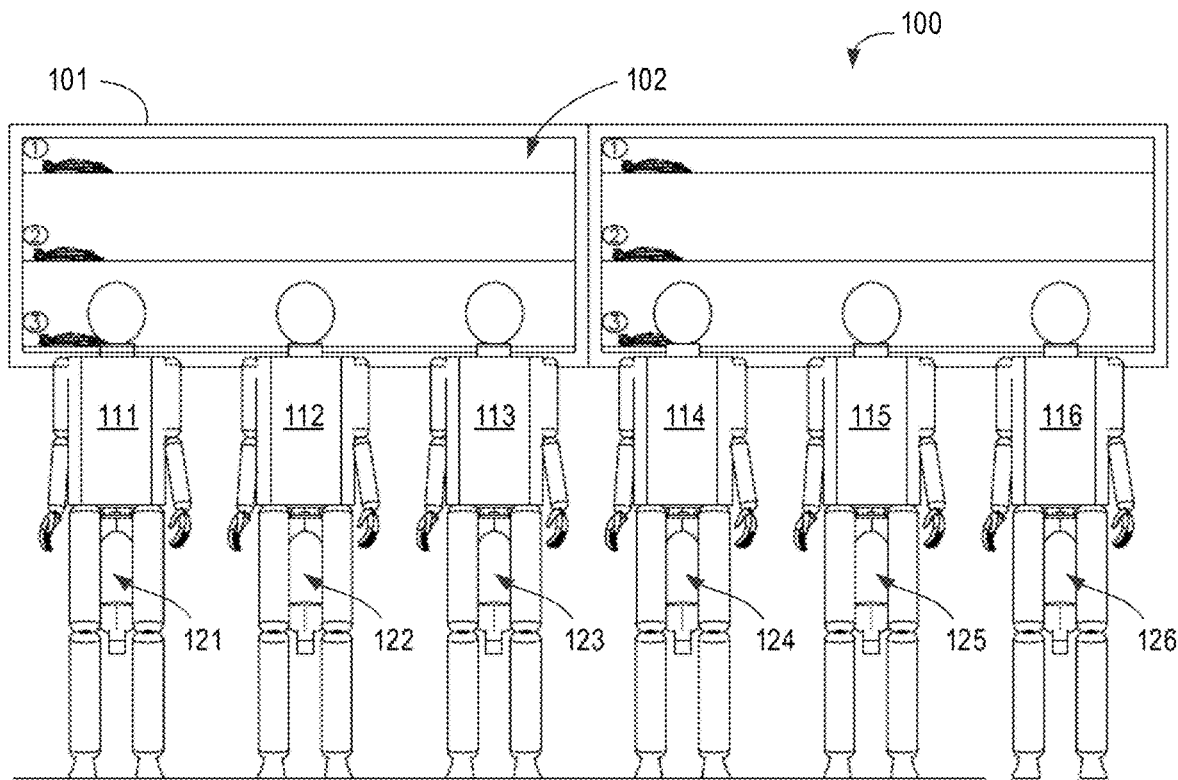
FIG. 1 is an elevation view of a set of users interacting with a multiplayer gaming system in accordance with various embodiments.

Referring first to the elevation view of FIG. 1, the present invention generally relates to a gaming system 100 in which a group of users 111-116 compete against each other based on a characteristic of their urine streams, which are collected by a set of respective urinals 121-126. The results of the game are presented, for example, on a common display (or common set of displays) 101 that is mounted above urinals 121-126 such that all of the users (and indeed other individuals in the vicinity) can view the game graphics 102 as rendered in substantial real time.

In the embodiment of FIG. 1, for example, the game graphics 102 simulate a drag race scenario in which a set of cars (each corresponding to a separate urinal 121-126) progress laterally across screen 101 in response to a characteristic of the users' respective urine streams. The winner of the game may be determined based on distance traveled, the time required to reach a finish line, or any other indicia. In this regard, while FIG. 1 illustrates a racing-type game, the invention is not so limited, as will be discussed in detail below.

Figure 2:
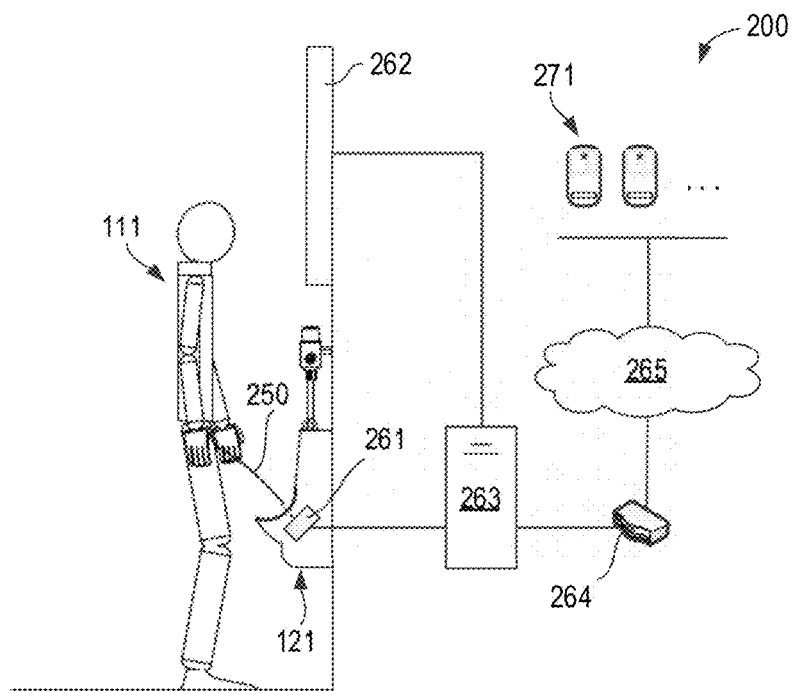
FIG. 2 is a schematic diagram of a multiplayer game system in accordance with various embodiments.

FIG. 2 is a schematic diagram of a multiplayer game system 200 in accordance with various embodiments. More particularly, a user (or game player) 111 suitably positions himself in front of a urinal 121 and produces a urine stream 250 that impinges upon, is collected by, or is otherwise sensed by a urine sensing system 261. A processing system 263 (e.g., a general purpose computer, a microcontroller, or the like) is communicatively coupled to urine sensing system 261, a display screen or monitor 262, and one or more network components 264 (e.g., modems, routers, switches, access points, etc.) configured to facilitate communication over network 265 with various portable computing devices 271 (e.g., smartphones, tablets computers, and the like).

Various additional hardware/plumbing components may also be incorporated into system 200, such as proximity sensors (configured to determine the presence and/or non-presence of a user in front of the urinal), auto-flush systems (configured to flush the urinal, for example, when a user finishes and walks away), pressure-sensing floor mats, and conventional, manually actuatable flushing components. Such additional components may also be coupled to processing system 263 and used to affect the state of the game as it progresses. For example, the game may begin for a particular user (and display 262 appropriately updated) when a proximity sensor determines that the user has stepped in front of urinal 121, and may end for that user when the proximity sensor determines that the user has stepped away (referred to as a "urination session"). In some embodiments, the total aggregate time that the user has engaged with the urinal is itself a factor in determining relatively ranking of the users within the game.

In some embodiments, an additional game controller including buttons, dials, joysticks, or the like may be incorporated into urinal 121 or otherwise positioned within arms-reach of user 111. In other embodiments, the user's mobile phone itself (and associated sensors) are used as game input.

The user's gestures (sensed by a gesture recognition system) and/or spoken utterances (sensed by a speech recognition module) may also be provided to processing system 265 as input, for example, to a chat window that is displayed alongside the game graphics during play.

While system 200 is illustrated in the context of a urinal of the type typically used by biological males while standing up, the invention is not so limited, and may be used in connection with conventional toilets or any other bathroom fixture in which a urine sensing system 261 can be incorporated. For example, the game system 200 may be implemented in the context of a trainer toilet used by children during potty training or, indeed, a toilet used by adolescent males of any age. In such cases, rather than being rendered as a simultaneous multiplayer game, the game results may be used to show an individual's progress (e.g., improvement in aim) over time relative to other players—as a multi-player competition between siblings or a group of friends.

Processing system 263 includes any suitable combination of hardware, software, and firmware configured to implement a multiplayer game whose input includes sensor data from multiple urine sensing systems 261—each corresponding to a separate urinal. A graphical depiction of the game as it progresses from start to finish is rendered on the common display 262. Thus, urinal 121 can be considered a non-standard form of gaming input-output (I/O) device. In some embodiments, mixed reality or augmented reality (AR) graphics are incorporated into system 200, allowing the user to experience the game through AR glasses or an AR application provided on the user's mobile phone.

Figure 3:
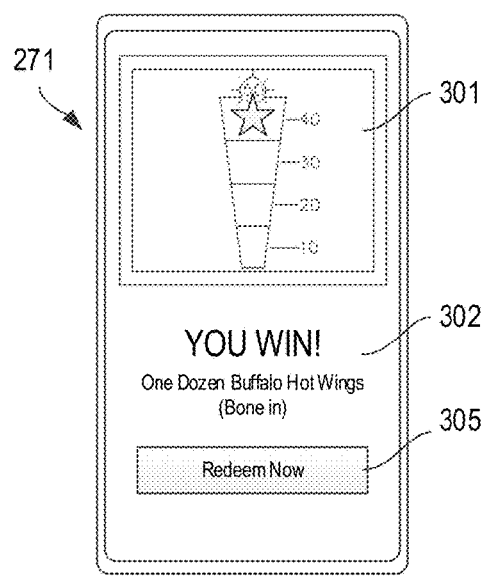
FIG. 3 illustrates an example user interface implemented on a mobile device in accordance with various embodiments.

The results of the game (e.g., a list of winners or the like) may be rendered on display 262 and/or sent over network 265 to be rendered on mobile devices 271. With momentary reference to FIG. 3, for example, an example mobile device 271 (perhaps under the control of user 111 of FIG. 2) displays a result graphic 301, a notification 302 relating to a prize that the user has won, and a button or other user interface element 305 that allows the user to redeem that prize. It will be appreciated that the example depicted in FIG. 3 is not intended to be limiting, however, and that any combination of graphics and user interface elements may be used.

Referring again to FIG. 2, in order to interact with game system 200, the user may be required to create an account with the organization that provides the game (and/or urinals 121-126). This account can then be used by the organization to provide the user with loyalty points, game winnings, targeted advertisements, or the like. In some embodiments, users are able to compete against other individuals at remote locations in real-time or in a time-shifted mode (e.g., individuals within a user's social media friends list). In such embodiments, the game logic itself may be implemented in whole or in part by a cloud-computing system rather than a local processing system 263.

As mentioned above, display 262 is preferably a common display, i.e., viewable simultaneously by all current players. In that regard, display 262 may be a large, single display (e.g., a high-res OLED display) or multiple displays that together render a contiguous graphical representation of the game. It will be appreciated that the use of a single, common display (rather than relatively small display screens provided for each of the urinals) enhances the multi-player aspects of the game, leading to greater user enjoyment. Thus, for example, in the context of a racing game, all of the active vehicles are displayed on a single screen (and perhaps single race course), or in the context of a role-playing game, each of the active characters are rendered on a single display within the same role-playing environment.

Figure 4:
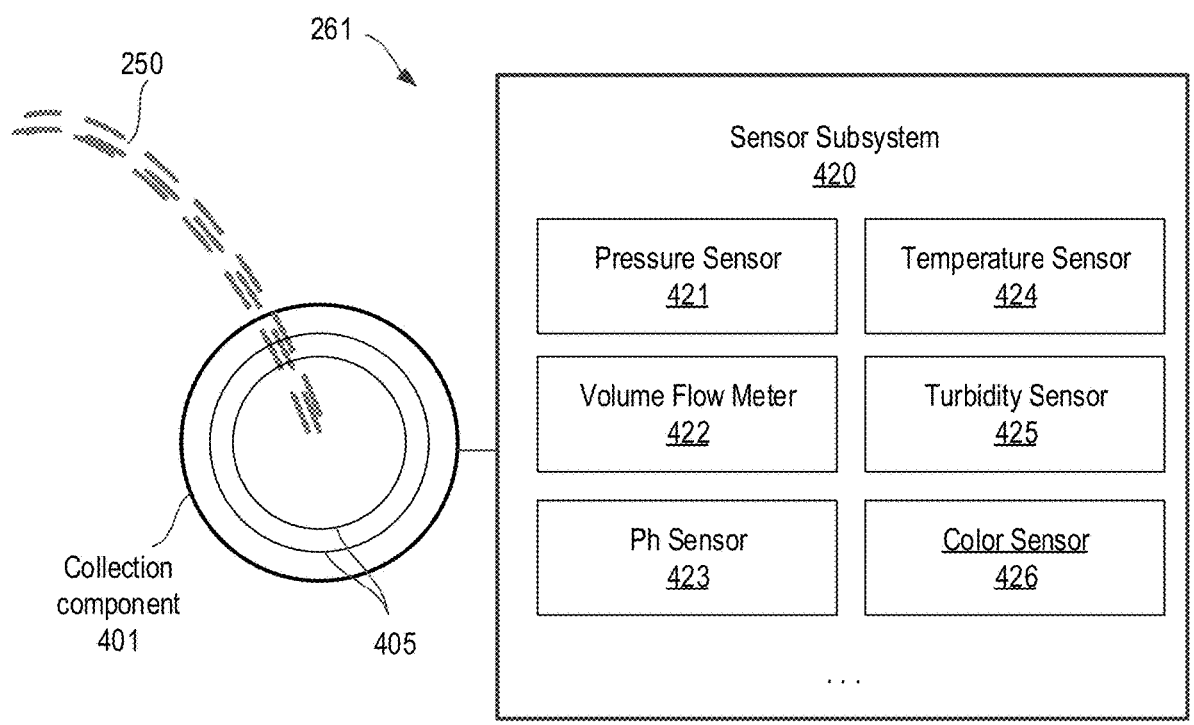
FIG. 4 is a conceptual block diagram of a collection component and sensor subsystem in accordance with various embodiments.

FIG. 4 is a conceptual block diagram of a urine sensing system 261 in accordance with one embodiment, which generally includes a collection component 401 and sensor subsystem 420. Collection component 401 is configured to receive the urine stream 250 and may also act as the housing for sensor subsystem 420. Collection component 401 may also include a variety of other subcomponents, such as urinal screens, urinal deodorizer blocks, or the like (not illustrated).

Collection component 401 may include concentric rings 405 or other compartments, regions, or sub-containers that are associated with various levels of accuracy (e.g., a "bullseye" pattern as shown) as viewed from the standpoint of a user. This accuracy can be used as an input to the game system in conjunction with one or more other attributes (e.g., flow rate) to derive an overall figure-of-merit for the urine stream. It will be appreciated that those charged with maintaining a bathroom have a significant interest in incentivizing users to urinate in the center of the urinal, rather than along its margins or, in the worst case, outside the urinal altogether. Thus, the accuracy attribute is a particularly advantageous attribute to incorporate in the game design.

The accuracy attribute may be derived and represented in a variety of ways. For example, with respect to derivation, the accuracy attribute may be determined based on a combination of urine volume (i.e., during a user's urination session) and urine collection location. That is, a number of discrete collection cells having individual flow-rate sensors (assembled in a circular or rectilinear pattern) may be used to determine a mean or max integrated flow volume. In other implementations, a set of discrete pressure sensors or load-cells are used to measure pressure over time at particular locations. In yet other implementations, a small number (e.g., 3 or 4) load cells are used to support a plate, and the position of the impinging urine stream is estimate based on the relative outputs of the load cells.

In terms of representation of the accuracy attribute, in a "bulls-eye" or polar coordinate system, accuracy may be represented as a real number in the interval [0, 1], where 0 represents the center of the bullseye and 1 represents a region well outside the target area. Alternatively, in a grid-based or Cartesian coordinate system, the accuracy may be represented as a coordinate pair of integers (x, y), where x=0 and y=0 is the point corresponding to the greatest accuracy and min and max values of x and y are used to delineate a square target region. In any event, the resulting real or integer values can be provided to processing system 263 and handled in the same manner that other numerical values from other I/O devices are traditional handled in video games.

Sensor subsystem 420 includes one or more sensors configured to determine various attributes of the urine stream, which can then be supplied to processing system 263. In various embodiments, subsystem 420 includes one or more of: (1) a pressure sensor (or load cell) 421 for measuring the varying pressure of the urine stream as it impinges upon a surface of collection component 401; (2) a volume flow meter 422 for measuring the flow rate (e.g., in milliliters per second) and/or total integrated urine volume (in milliliters) of the urine as it passes over or through collection component 401; (3) a pH sensor 423 for measuring the acidity/alkalinity) of the urine collected by collection component 401; (4) a temperature sensor 424 for determining the temperature of the urine; (5) a turbidity sensor 425 for sensing the turbidity or "cloudiness" of the received urine; and (6) a color sensor 426 for sensing effective RGB components of light passing through a sample of the urine.

In accordance with some embodiments, the urine attributes sensed by sensor subsystem 420 are used not just to affect game play, but also to provide the user with health-related information. For example, based on urine color, the user may be prompted to drink more water (in the case of dark yellow urine) and/or check for kidney damage (suggested by reddish urine containing red blood cells). Similarly, excessive turbidity may indicate a urinary tract infection or an obstruction. In some embodiments, the collected urine may be automatically tested for drugs and/or performance enhancing substances. In some embodiments, the prize awarded to the user is informed by these health-related attributes—e.g., a two-liter bottle of water may be awarded to an individual whose urine color suggests that he is dehydrated.

In some embodiments, one or more of the urine attributes are used in determining whether and to what extent the urinal and/or associated plumbing should undergo preventative maintenance. For example, more frequent maintenance may be performed for urinals that have experienced an overall greater aggregate urine flow and/or lower (acidic) pH.

The above systems and methods may be used in connection with any form of multiplayer game, whether in a competitive mode, team mode, or cooperative mode. Examples of such multiplayer games include racing games (e.g., automotive, sailboat, or aircraft racing in which speed is proportional to the urine's accuracy/flow-rate), third-person shooting games (in which, for example, the urine accuracy is associated with shooting accuracy), platformer games, fighting games, survival games, rhythm games (in which, for example, the user has to modulate the urine stream in time with a soundtrack); interactive movies, drinking games, tactical or sandboxed role-playing games, simulation games, strategy games, tower defense games, sports games, puzzle games, advergames (games combined with advertisements), exergames (games combined with exercise).

In the interest of providing further non-limiting examples, FIGS. 5A-5F illustrate various user interfaces and game graphics associated with a multiplayer gaming system in accordance with various embodiments. While not always illustrated in FIGS. 5A-5F, it will be appreciated that every active urine sensing system (i.e., at urinals where a user is currently urinating and participating in the game) will have a corresponding graphical element on the common display.

Figure 5A:
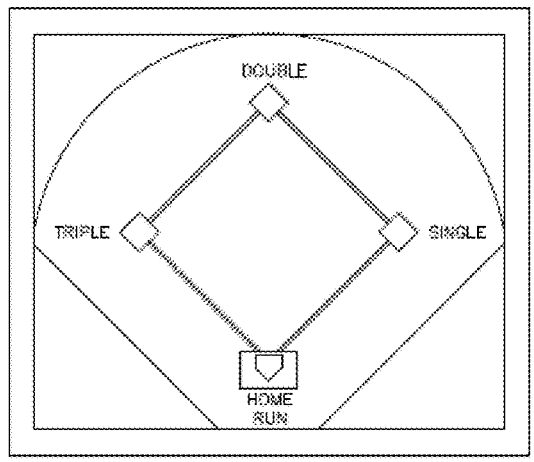
FIGS. 5A-5F illustrate various user interfaces and game graphics associated with a multiplayer gaming system in accordance with various embodiments.

FIG. 5A illustrates a baseball game in which the user's urine attributes control one or more baseball activities, such as pitching, catching, batting, and running. Each of the players may play a particular position, based on, for example, the order in which the users began playing and/or by explicit choice of the user. Players are then ranked based on a point scheme (e.g., points associated with a single, double, triple, home-run, strike-out, etc.)

Figure 5B:
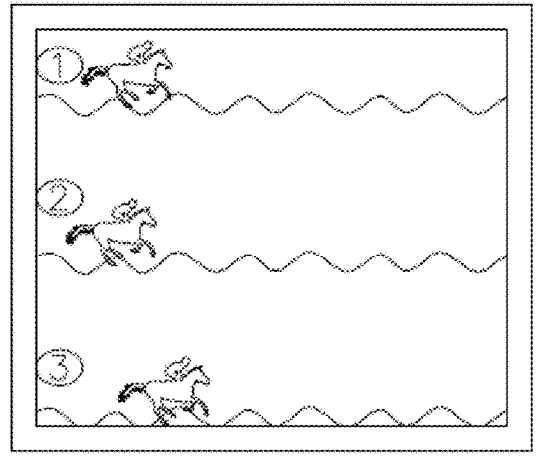
Figure 5C:
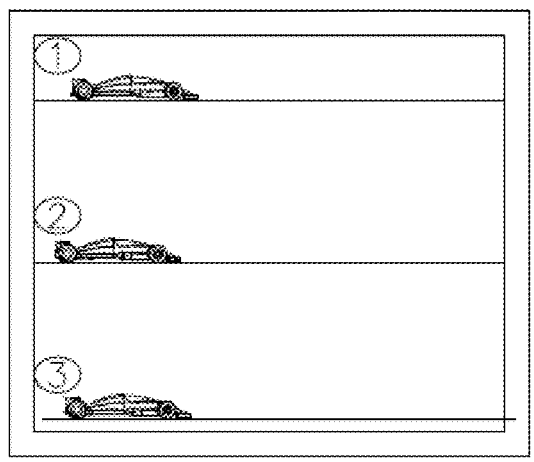

FIG. 5B illustrates a horse race in which the user's urine attributes (e.g., accuracy and/or flow-rate) are used to control the progress of the user's horse across the screen. Players are ranked based on time to reach the finish line (not illustrated) or total distance traveled. FIG. 5C illustrates a similar scenario in which vehicles (e.g., dragsters) are used in place of horses.

Figure 5D:
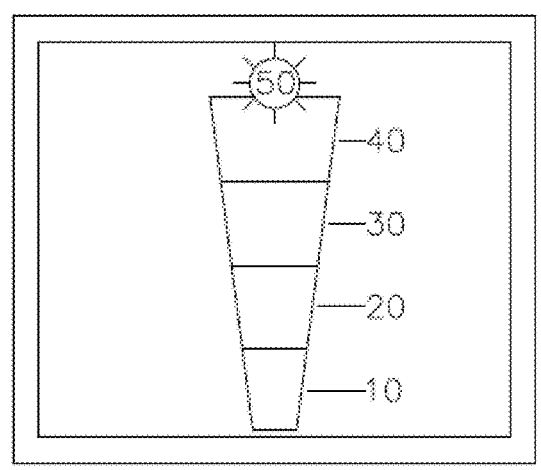

FIG. 5D illustrates a type of "test your might" contest (traditionally seen at county fairs) in which the user's urine attributes (e.g., total flow rate or integrated urine volume) controls the height that a graphical component (e.g., a star or other object) reaches on a vertical scale. Points are awarded based on the final height reached.

Figure 5E:
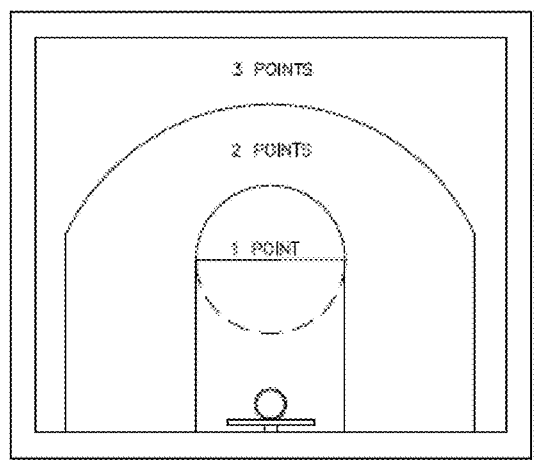

FIG. 5E illustrates a basketball shooting game in which the user's urine attributes (e.g., accuracy and/or flow-rate) are used to control the flight of a basketball. Scoring is based on the total number of points achieved by each user, wherein greater points are awarded for greater shot distances.

Figure 5F:
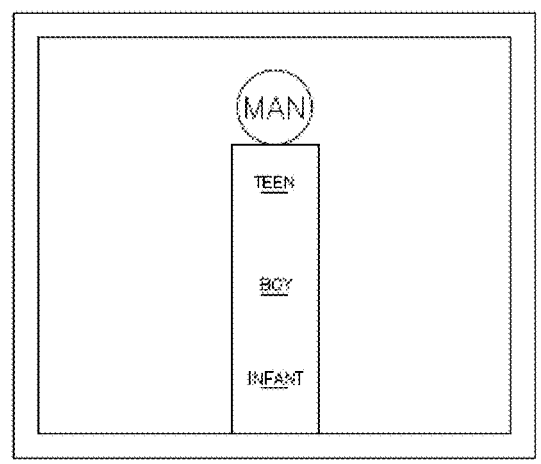

FIG. 5F illustrates a "manhood challenge"—a variation of the "test your might" challenge shown in FIG. 5D—in which the user's urine attributes (e.g., flow-rate or integrated total urine flow) are used to determine a height along a vertical scale that includes a range of labels, such as infant", "boy", "teen", and "man."

In summary, systems and methods for urinal-based multiplayer games have been described. In one embodiment, the system includes a plurality of urinals, each including a respective urine sensing system, each urine sensing system configured to sense, when active, a urine stream attribute of urine collected at that urinal. A common display is viewable from each of the plurality of urinals. A processing system is communicatively coupled to the common display and each of the urine sensing systems, wherein the processing system is configured to: execute a computer-implemented game responsive to urine stream attributes received from the active urine sensing systems; and render game graphics on the common display during execution of the computer-implemented game, wherein the game graphics include, for each of the active urine sensing systems, a corresponding graphical component.

In accordance with one embodiment, each of the urine sensing systems include a collection component communicatively coupled to a sensor subsystem.

In accordance with one embodiment, the sensor subsystem includes at least one of: a pressure sensor, a volume flow meter, a pH sensor, a temperature sensor, a turbidity sensor, and a color sensor.

In accordance with one embodiment, the collection component includes multiple collection regions.

In accordance with one embodiment, the urine stream attribute is an accuracy attribute indicative of the closeness of an incoming urine stream to an optimum location within the respective urinal.

In accordance with one embodiment, the urine stream attribute is a volumetric attribute indicative of the total volume of a urine stream collected by the respective urinal during a user's urination session.

In accordance with one embodiment, the urine stream attribute is a volumetric attribute indicative of the total volume of a urine stream collected by the respective urinal during a user's urination session.

In accordance with one embodiment, the computer implemented game is a race game and graphical components associated with each of the active urine sensing systems progress from one side of the common display to a second side of the common display.

In accordance with one embodiment, the urine stream attributes include at least one health-related attribute.

In accordance with one embodiment, the processing system is configured to provide a user with a reward based on an outcome of the computer implemented game.

In accordance with one embodiment, the processing system is configured to communicate with a mobile device over a network, and the processing system delivers the reward to the mobile device over the network.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A urinal-based multiplayer gaming system comprising:
a plurality of urinals, each including a respective urine sensing system, each urine sensing system configured to sense, when active, a urine stream attribute of urine collected at that urinal;
a common display viewable from each of the plurality of urinals; and
a processing system communicatively coupled to the common display and each of the urine sensing systems;
wherein the processing system is configured to:
execute a computer-implemented game responsive to urine stream attributes received from the active urine sensing systems; and
render game graphics on the common display during execution of the computer-implemented game, wherein the game graphics include, for each of the active urine sensing systems, a corresponding graphical component;
wherein each of the urine sensing systems include a collection component communicatively coupled to a sensor subsystem, and the collection component includes multiple collection regions configured to momentarily capture the urine stream; and
wherein the sensor subsystem includes: (a) a first sensor module including at least one of a pressure sensor and a volume flow meter; and (b) a second sensor module including at least one of a pH sensor, a temperature sensor, a turbidity sensor, and a color sensor; wherein the urine stream attributes include at least one health-related attribute that is assessed via the second sensor module.

2. The system of claim 1, wherein the urine stream attribute is an accuracy attribute indicative of the closeness of an incoming urine stream to an optimum location within the respective urinal.

3. The system of claim 1, wherein the urine stream attribute is a volumetric attribute indicative of the total volume of a urine stream collected by the respective urinal during a user's urination session.

4. The system of claim 1, wherein the computer implemented game is a race game and graphical components associated with each of the active urine sensing systems progress from one side of the common display to a second side of the common display.

5. The system of claim 1, wherein the processing system is configured to provide a user with a reward based on an outcome of the computer implemented game.

6. The system of claim 5, wherein the processing system is configured to communicate with a mobile device over a network, and the processing system delivers the reward to the mobile device over the network.

* * * * *